United States Patent
Murakami

(10) Patent No.: US 7,987,041 B2
(45) Date of Patent: Jul. 26, 2011

(54) MONITORING SYSTEM FOR INTERNAL COMBUSTION ENGINE

(75) Inventor: Yoshifumi Murakami, Obu (JP)

(73) Assignee: DENSO CORPORATION, Kariya (JP)

( * ) Notice: Subject to any disclaimer, the term of this patent is extended or adjusted under 35 U.S.C. 154(b) by 354 days.

(21) Appl. No.: 12/107,933

(22) Filed: Apr. 23, 2008

(65) Prior Publication Data

US 2008/0288160 A1  Nov. 20, 2008

(30) Foreign Application Priority Data

May 15, 2007  (JP) .................................. 2007-129805

(51) Int. Cl.
  *B60T 7/12* (2006.01)
(52) U.S. Cl. ........................................ 701/104; 123/305
(58) Field of Classification Search .................. 701/104, 701/105, 103; 123/434, 294, 305, 690, 479, 123/480
  See application file for complete search history.

(56) References Cited

U.S. PATENT DOCUMENTS

| | | | |
|---|---|---|---|
| 5,201,294 A * | 4/1993 | Osuka | 123/458 |
| 5,367,264 A | 11/1994 | Brabetz | |
| 5,485,822 A * | 1/1996 | Hirose et al. | 123/501 |
| 5,848,581 A * | 12/1998 | Hirose et al. | 123/357 |
| 7,194,997 B2 | 3/2007 | Pitzal et al. | |
| 2005/0027431 A1 * | 2/2005 | Todoroki et al. | 701/105 |

FOREIGN PATENT DOCUMENTS

| | | |
|---|---|---|
| JP | 9-112318 | 4/1997 |
| JP | 2005-55967 | 3/2005 |

OTHER PUBLICATIONS

Office Action (1 pg.) dated Oct. 18, 2010 issued in corresponding Japanese Application No. 2007-129805 with an at least partial English-language translation thereof (1 pg.).
Office Action dated Nov. 12, 2010 issued in corresponding Chinese Application No. 200810097092.4 and an at least partial English-language translation thereof.

* cited by examiner

*Primary Examiner* — John T Kwon
(74) *Attorney, Agent, or Firm* — Nixon & Vanderhye P.C.

(57) ABSTRACT

According to the present invention, a monitoring system for an internal combustion engine includes a fuel injection control means for outputting a fuel injection signal to an injector based on a target fuel injection quantity and a target fuel injection timing according to a driving condition of the engine. The monitoring system further includes a computation means for computing an actual fuel injection quantity and an actual fuel injection timing based on the fuel injection signal, and a determination means for determining whether a fuel injection malfunction exists by comparing the actual fuel injection quantity and the target fuel injection quantity and comparing the actual fuel injection timing and the target fuel injection timing.

6 Claims, 5 Drawing Sheets

MONITORING SYSTEM FOR INTERNAL COMBUSTION ENGINE

CROSS-REFERENCE TO RELATED APPLICATION

This application is based on Japanese Patent Application No. 2007-129805 filed on May 15, 2007, the disclosure of which is incorporated herein by reference.

FIELD OF THE INVENTION

The present invention relates to a monitoring system for an internal combustion engine which determines whether the engine has a malfunction.

BACKGROUND OF THE INVENTION

JP-P2005-522617A (U.S. Pat. No. 7,194,997B2) shows monitoring method for an internal combustion engine in which a current torque is computed based on an actual fuel injection quantity and/or a target fuel injection quantity. When the current torque is larger than a permissible torque, a fuel cut is performed.

In a certain driving condition of the engine, even if fuel injection quantity increases, the actual torque may not increase unless a fuel injection timing is changed. In the above method, since the current torque is computed based on a fuel injection quantity without considering the fuel injection timing, if the fuel injection quantity is increased and actual torque does not increase due to the fuel injection timing, the current torque may become larger than the permissible torque. As the result, it may be determined that the torque is excessively increased and the fuel cut may be performed.

In a direct injection engine, a combustion mode is changed between a homogeneous combustion mode and a stratified combustion mode. Generally, in the homogeneous combustion mode, the fuel injection quantity is determined based on an intake air flow rate which is adjusted by a throttle valve to control the torque. An actual torque is accurately obtained by computing an air-quantity-base actual torque based on an intake air quantity. In the stratified combustion mode, the torque is controlled by adjusting fuel injection quantity in a condition that the throttle valve is fully opened. The actual torque is obtained by computing a fuel-quantity-base actual torque based on the fuel injection quantity.

In the stratified combustion mode, when the fuel injection timing is moved into an intake stroke or its vicinity, the combustion mode is close to the homogeneous combustion even though the combustion mode is the stratified combustion. In such a case, even if the combustion mode is the stratified combustion which is suitable for the fuel-quantity-base actual torque, the computation accuracy of the fuel-quantity-base actual torque is deteriorated so that it cannot be accurately determined whether a torque malfunction exists.

SUMMARY OF THE INVENTION

The present invention is made in view of the above matters, and it is an object of the present invention to provide a monitoring system for an internal combustion engine capable of detecting the torque malfunction accurately.

According to the present invention, a monitoring system for an internal combustion engine includes a fuel injection control means for outputting a fuel injection signal to an injector based on a target fuel injection quantity and a target fuel injection quantity according to a driving condition of the engine. The monitoring system further includes a computation means for computing an actual fuel injection quantity and an actual fuel injection timing based on the fuel injection signal, and a determination means for determining whether a fuel injection malfunction exists by comparing the actual fuel injection quantity and the target fuel injection quantity and comparing the actual fuel injection timing and the target fuel injection timing.

Since both actual fuel injection quantity and the actual fuel injection timing can be monitored, an existence of the fuel injection malfunction can be accurately detected. Even if fuel injection quantity increases, when the actual torque does not increase due to the fuel injection timing, it can prevent performing the erroneous determination that the fuel injection malfunction exists, and can prevent performing the fail-safe processing erroneously.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

An embodiment of the present invention will be described hereinafter.

Figure 1:
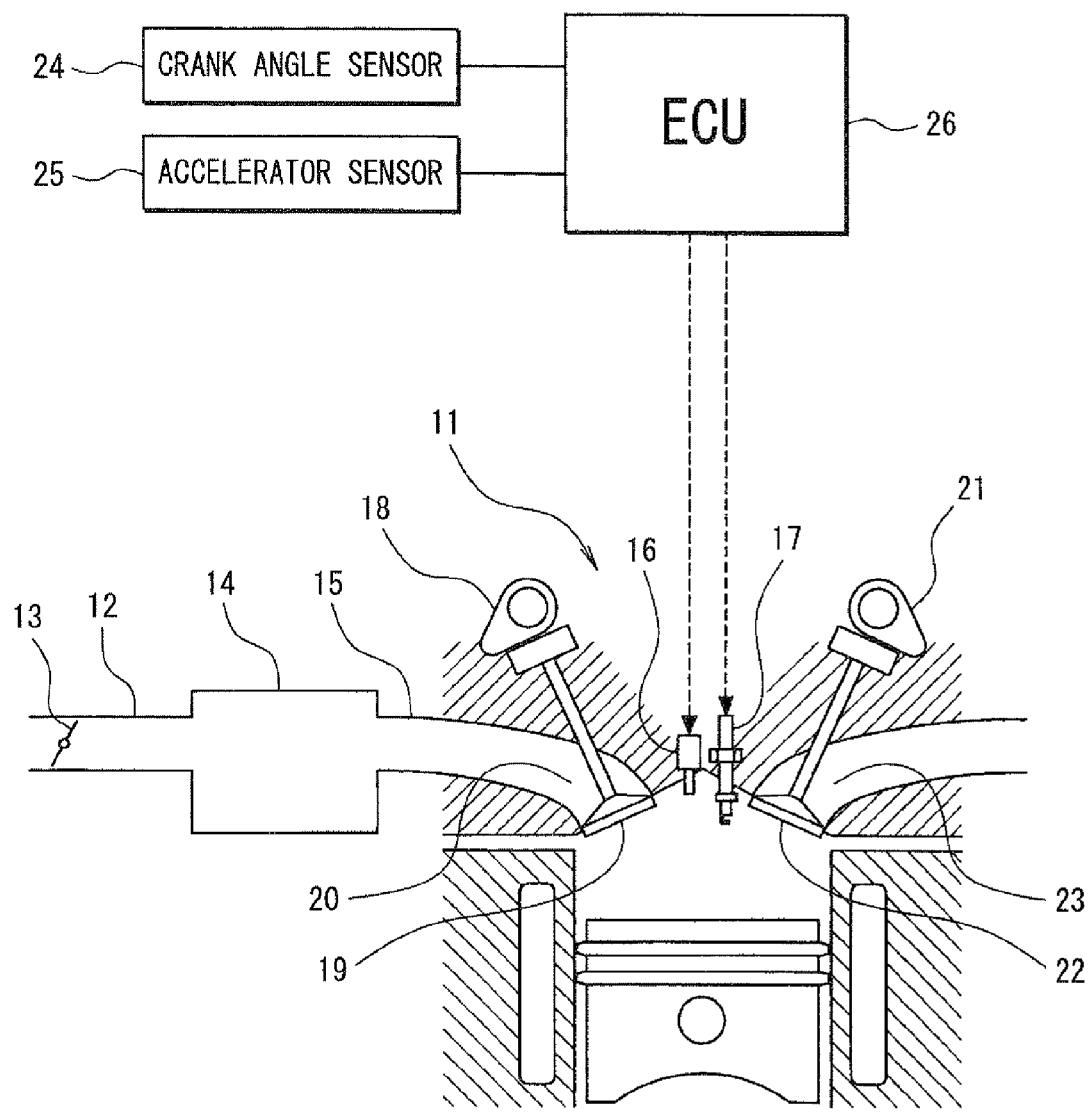
FIG. 1 is a schematic view of an engine control system according to an embodiment of the present invention.

Referring to FIG. 1, an engine control system is explained. An intake pipe 12 of a direct injection engine 11 is provided with a throttle valve 13 of which position is controlled by a motor (not shown). A surge tank 14 is provided down steam of the throttle valve 13. An intake air manifold 15 is connected to the surge tank 14 to introduce air into the engine 11.

A fuel injector 16 is provided on an upper portion of each cylinder of the engine 11 to inject fuel directly into the cylinder. A spark plug 17 is mounted on a cylinder head of the engine 11 corresponding to each cylinder to ignite air-fuel mixture in each cylinder. An intake valve 19 is driven by an intake cam 18 to open and close an intake port 20. An exhaust valve 22 is driven by an exhaust cam 21 to open and close an exhaust port 23.

A crank angle sensor 24 is installed on a cylinder block to output crank angle pulses when a crankshaft (not shown) rotates a predetermined angle. Based on this crank angle pulses, a crank angle and an engine speed are detected. An accelerator sensor 25 detects a position of an accelerator pedal.

The outputs of the sensors are inputted to an electronic control unit (ECU) 26. The ECU 26 includes a microcomputer and a read only memory (ROM) to control a fuel injection quantity of the fuel injector 16 and an ignition timing of the spark plug 17.

Figure 2:
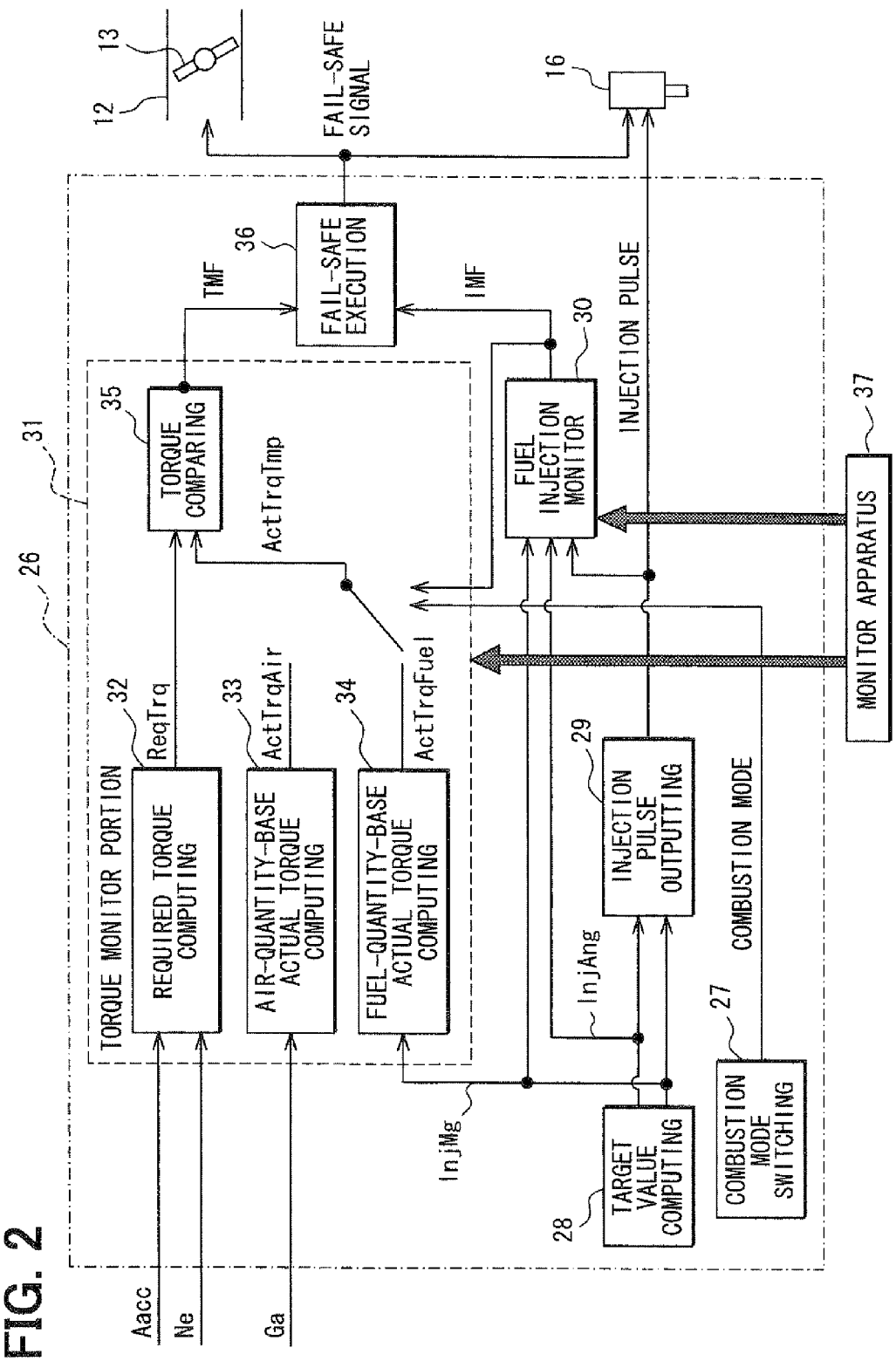
FIG. 2 is a block diagram for explaining a fuel injection malfunction determination and a torque malfunction determination.

As shown in FIG. 2, the ECU 26 includes a combustion mode switching portion 27 which switches a combustion mode between a stratified combustion mode and a homogenous combustion mode according to an engine driving condition such as engine speed, engine load and the like. In the stratified combustion modes a little amount of fuel is directly injected into the cylinder during a compression stroke. A stratified air-fuel mixture is formed at a vicinity of the spark plug 17 to perform a stratified combustion (lean combustion) to improve fuel economy. In the homogeneous combustion mode, the fuel is directly injected into the cylinder during an intake stroke. A homogenous air-fuel mixture is formed to perform a homogeneous combustion (stoichiometric combustion or rich combustion) to improve an engine output.

The ECU 26 includes a target value computation portion 28 which computes a target fuel injection timing (InjAng) and a target fuel injection quantity (InMg). The ECU 26 includes an injection pulse output portion 29 which outputs injection pulse signals to the fuel injector 16 in such a manner as to obtain the InjAng and the InMg. The target value computation portion 28 and the injection pulse output portion 29 function as a fuel injection controller.

Figure 3:
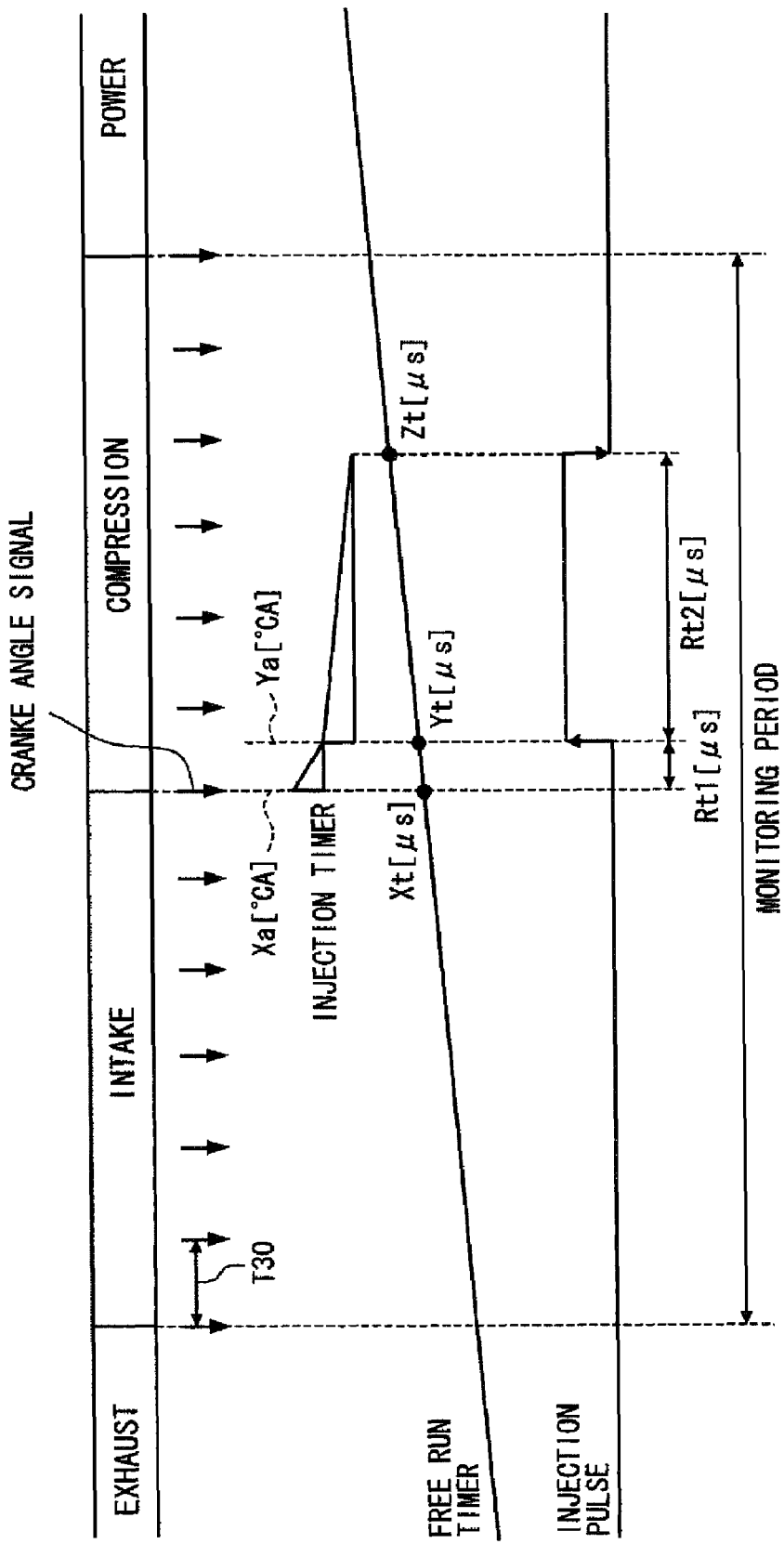
FIG. 3 is a time chart for explaining a computing method of an actual fuel injection timing and an actual fuel injection quantity.

Specifically, as shown in FIG. 3, an injection timer is started from the crank angle signal as a reference The crank angle signals are outputted from the crank angle sensor 24 when the crankshaft rotates a specified angle, for example 30° CA. Based on a count value of the injection timer, a fuel injection pulse signal is risen at a time of InAng and the fuel injection pulse signal is fallen at a time when a fuel injection period corresponding to the InjMg has passed from the IngAng.

As shown in FIG. 2, the ECU 26 includes a fuel injection monitor portion 30 which computes an actual fuel injection start timing (Ya) and an actual fuel injection quantity (Rq) and determines that there is an malfunction in fuel injection when a difference between Ya and InAng is larger than a specified value KA and when a difference between the Rq and the InjMg is larger than a specified value KM. The fuel injection monitor portion 30 functions as a computer of fuel injection execution values and a determiner of fuel injection malfunction.

Specifically, as shown in FIG. 3, based on count values of a free run timer, the fuel injection monitor portion 30 stores a time Xt[µs] corresponding to a reference crank angle position Xa[°CA], a time Yt[µs] corresponding to a rising timing of the fuel injection pulse, and a time Zt[µs] corresponding a falling time of the fuel injection pulse. The reference crank angle position Xa[°CA] is, for example, a bottom dead center at the intake stroke The fuel injection monitor portion 30 computes a waiting period Rt1 which corresponds to a time period from the time Xt to the time Yt. (Rt1=Yt−Xt) Further, the fuel injection monitor portion 30 computes an actual fuel injection period Rt2 which corresponds to a time period from the Yt to the Xt. The fuel injection period Rt2 represents an actual fuel injection pulse width.

The Ya [°CA] is computed according to a following formula.

$$Ya=Xa+(Rt1/T30)\times 30$$

T30 is a time period (an interval of output pulse signal of the crank angle sensor 24) required for the crankshaft to rotate 30°CA.

An effective fuel injection period Tf is obtained by subtracting an ineffective fuel injection period Td[µs] from the Rt2[µs]. The Rq[mg] is computed by use of a map or formula according to the Tf and a fuel pressure Pf.

Then, the fuel injection monitor portion 30 determines whether a difference between the Ya and the InjAng is larger than the KA and whether a difference between the Rq and the InjMg is larger than the KM.

When it is determined the difference between the Ya and the InjAng is larger than the KA and the difference between the Rq and the InjMg is larger than the KM, the Rq is excessively increased relative to the InjMg and the Ya excessively deviates from the InjAng. The monitor portion 30 determines that there is a fuel injection malfunction in which the torque is abnormally increased.

As shown in FIG. 2, the ECU 26 includes a torque monitor portion 31 which determines whether a torque-malfunction exists. In a required torque computing portion 32, a required torque (ReqTrq) is computed based on an accelerator position (Aacc) and an engine speed (Ne) by use of maps or formulas.

An air-quantity-base actual torque computing portion 33 computes an air-quantity-base actual torque (ActTrqAir) based on an intake air quantity (Ga) by use of maps or formulations. A fuel-quantity-base actual torque computing portion 34 computes a fuel-quantity-base actual torque (ActTrqFuel) based on the InjMg or an air-fuel ratio by use of maps or formulations.

In a case that the fuel injection monitor portion 30 determines that no fuel injection malfunction exists, when the combustion mode is the homogeneous combustion mode, the ActTrqAir is selected as a determining malfunction actual torque (ActTrqTmp). A torque comparing portion 35 compares the ActTrqTmp, which is equal to the ActTrqAir, with the ReqTrq in order to determine whether the torque malfunction exists. When the combustion mode is the stratified combustion mode, the ActTrqFuel is selected as the ActTrqTmp. The torque comparing portion 35 compares the ActTrqTmp, which is equal to the ActTrqFuel, with the ReqTrq.

In a case that the fuel injection monitor portion 30 determines that a malfunction exists, without respect to the combustion mode, the ActTrqAir is selected as the ActTrqTmp. The torque comparing portion 35 compares the ActTrqTmp with the ReqTrq to determine whether the torque combustion exists. Even in the stratified combustion mode which is suitable for the ActTrqFuel, there is a possibility that the combustion state is close to the homogeneous combustion mode which is suitable for the ActTrqAir. The ActTrqAir is selected as the ActTrqTmp to accurately determine whether the torque malfunction exists.

When the fuel injection monitor portion 30 determines that the fuel injection malfunction exists, or when the torque monitor portion 31 determines that the torque malfunction exists, a fail-safe execution portion 36 outputs a fail-safe signal to the driving motor of the throttle valve 13 so that the opening degree of the throttle valve 13 is restricted to a predetermined value, or outputs a fail-safe signal to the fuel injector 16 so that the fuel injection quantity is restricted under a predetermined quantity. Hence, the vehicle can run safely.

A monitor apparatus 37 is provided besides the ECU 26. The monitor apparatus 37 includes a central processing unit (CPU) and an application specific IC (ASIC). The monitor apparatus 37 monitors a monitor function of the fuel injection monitor portion 30 and a monitor function of the torque monitor portion 31.

Figure 4:
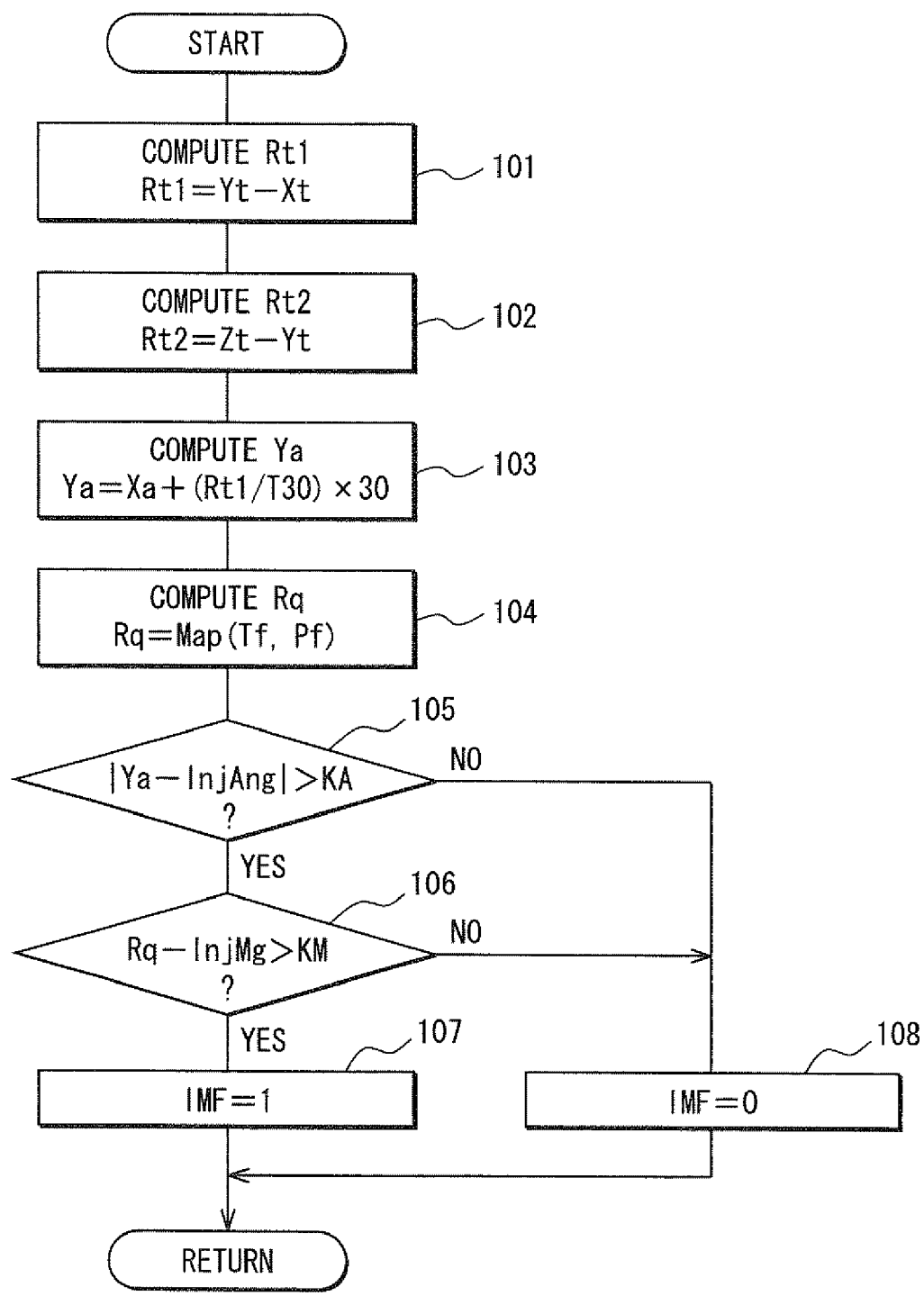
FIG. 4 is a flowchart showing a process of a fuel injection malfunction determination routine.
Figure 5:
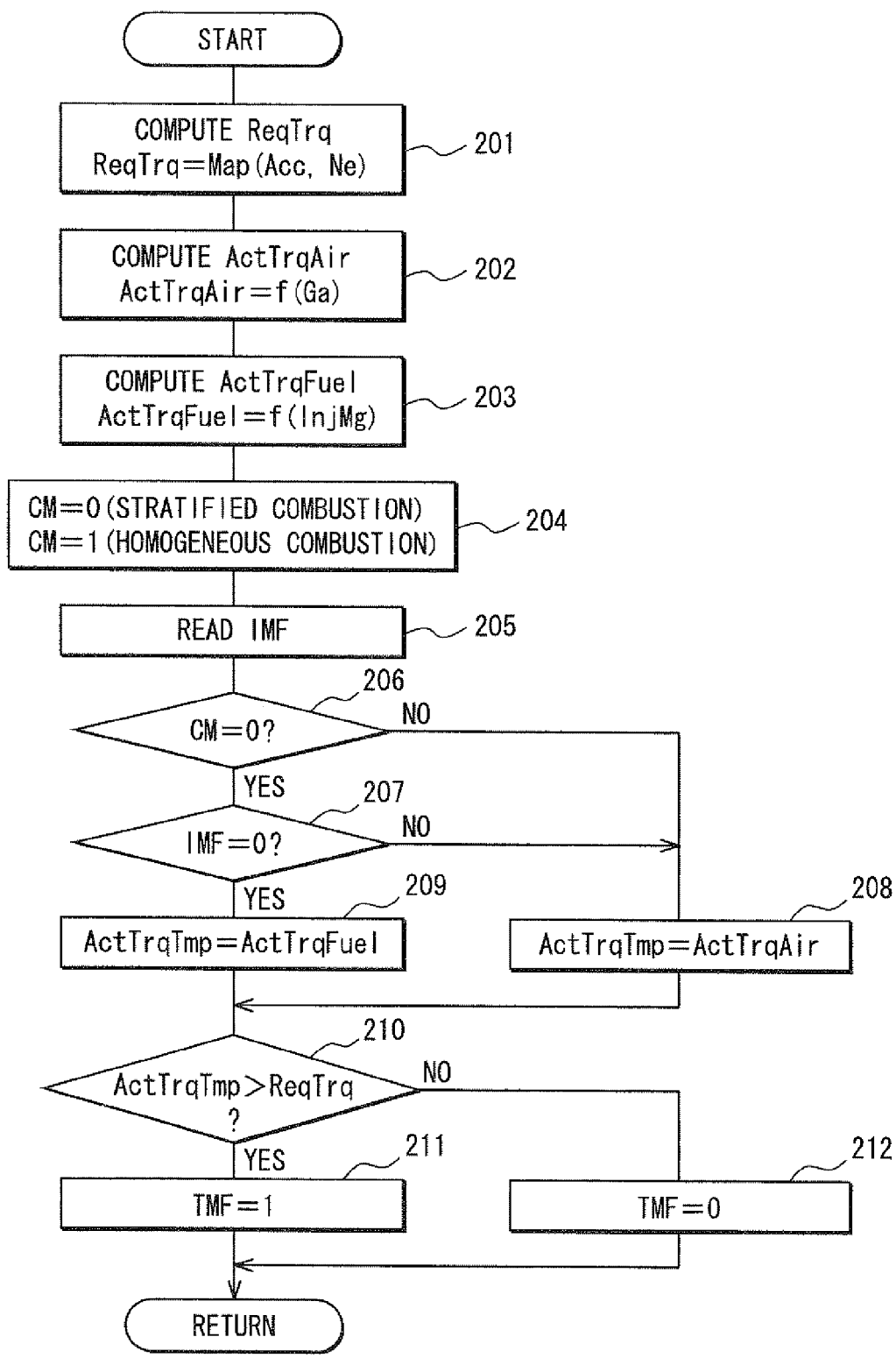
FIG. 5 is a flowchart showing a process of a torque malfunction determination routine.

The above fuel injection malfunction determination and the torque malfunction determination are executed by the ECU 26 according to each routine shown in FIGS. 4 and 5.

[Fuel Injection Malfunction Determination Routine]

A fuel injection malfunction determination routine shown in FIG. 4 is executed in at specified intervals while the ECU 26 is ON. In step 101, the waiting period Rt1 is computed.

$$Rt1=Yt-Xt$$

In step 102, the actual fuel injection period Rt2 representing the actual fuel injection pulse width is computed.

$$Rt2=Zt-Yt$$

In step 103, the actual fuel injection start timing Ya [°CA] is computed according to a following formula.

$$Ya=Xa+(Rt1/T30)\times 30$$

In step 104, the effective fuel injection period Tf is obtained by subtracting an ineffective fuel injection period Td[µs] from the Rt2[µs]. The Rq[mg] is computed by use of a map or a formula according to the Tf and the fuel pressure Pf.

$$Rq=Map(Tf,Pf)$$

In step 105, it is determined whether the difference between the Ya and the InjAng is larger than the KA. In step 106, it is determined whether the difference between the Rq and the InjMg is larger than the KM.

When it is determined the difference between the Ya and the InjAng is larger than the KA in step 105 and the difference between the Rq and the InjMg is larger than the KM in step 106, the Rq is excessively increased relative to the InjMg and the Ya excessively deviates from the InjAng. It is determined that there is a fuel injection malfunction in which the torque is abnormally increased. The procedure proceeds to step 107 in which a fuel injection malfunction flag (IMF) is set to "1" and a warning lump on an instrument panel of the vehicle is tuned on to notify a driver of the malfunction. Malfunction information (malfunction code) is stored in backup RAM (not shown) of the ECU 26.

When the answer is No in step 105 or when the answer is No in step 106, the procedure proceeds to step 108 in which the IMF is set to "0".

[Torque Malfunction Determination Routine]

A torque malfunction determination routine is executed at specified intervals while the ECU 26 is ON. In step 201, the required torque (ReqTrq) is computed based on an accelerator position (Aacc) and an engine speed (Ne) by use of maps or formulas.

$$ReqTrq=Map(Aacc,Ne)$$

In step 202, the air-quantity-base actual torque (Act-TrqAir) is computed based on an intake air quantity (Ga) by use of maps or formulations.

$$ActTrqAir=f(Ga)$$

In step 203, the fuel-quantity-base actual torque (ActTrq-Fuel) based on the InjMg or an air-fuel ratio by use of maps or formulations.

$$ActTrqFuel=f(InjMg)$$

In step 204, when the combustion mode is the stratified combustion mode, a combustion mode flag (CM) is reset to "0". When the combustion mode is the homogeneous combustion mode, the CM is set to "1". In step 205, the IMF is read.

In step 206, it is determined whether the CM is "0". When the answer is No, the procedure proceeds to step 208 in which the ActTrqAir is defined as the ActTrqTmp.

$$ActTrqTmp=ActTrqAir$$

In step 210, it is determined whether the ActTrqTmp (=ActTrqAir) is larger than the ReqTrq.

When the answer is Yes in step 206, the procedure proceeds to step 207 in which it is determined whether the IMF is "0". When the answer is Yes in step 207, the procedure proceeds to step 209 in which the ActTrqFuel is defined as the Act-TrqTmp.

$$ActTrqTmp=ActTrqFuel$$

Then, the procedure proceeds to step 210 in which it is determined whether the ActTrqTmp (=ActTrqFuel) is larger than the Reqtrq.

Even if the answer is Yes in step 206, when the answer is No in step 207, the procedure proceeds to step 208 in which the ActTrqAir is defined as the ActTrqTmp.

$$ActTrqTmp=ActTrqAir$$

Then the procedure proceeds to step 210 in which it is determined whether the ActTrqTmp (=ActTrqAir) is larger than the Reqtrq. Even in the stratified combustion mode which is suitable for the ActTrqFuel, there is a possibility that the combustion state is close to the homogeneous combustion mode which is suitable for the ActTrqAir The ActTrqAir is selected as the ActTrqTmp to accurately determine whether the torque malfunction exists.

When the answer is Yes in step 210, the procedure proceeds to step 211 in which the TMF is set to "1" and the warning lump on the instrument panel of the vehicle is tuned on to notify the driver of the malfunction. The malfunction information (malfunction code) is stored in backup RAM (not shown) of the ECU 26.

When the answer is No in step 210, the procedure proceeds to step 212 in which the TMF is reset to "0".

According to the embodiment, the Ya and the Rq are computed based on the fuel injection pulses. When it is determined the difference between the Ya and the InjAng is larger than the KA and the difference between the Rq and the InjMg is larger than the KM, the Rq is excessively increased relative to the InjMg and the Ya excessively deviates from the InjAng. It is determined that there is a fuel injection malfunction in which the torque is abnormally increased. Hence, the fuel injection malfunction is accurately detected. Even if fuel injection quantity increases, when the actual torque does not increase due to the fuel injection timing, it can prevent performing the erroneous determination that the fuel injection malfunction exists, and can prevent performing the fail-safe processing erroneously.

According to the embodiment, without respect to the combustion mode, when the fuel injection malfunction exists, the ActTrqAir is defined as the ActTrqTmp and the Req is compared with the ActTrqTmp to determine whether the torque malfunction exists. Thereby, even in the stratified combustion mode which is suitable for the ActTrqFuel, there is a possibility that the combustion state is close to the homogeneous combustion mode which is suitable for the ActTrqAir. The ActTrqAir is selected as the ActTrqTmp to accurately determine whether the torque malfunction exists.

In the present embodiment, since the monitor apparatus 37 monitors the function of the fuel injection monitor portion 30 and the function of the torque monitor portion 31, the credibility of the fuel injection monitor portion 30 and the torque monitor portion 31 are improved.

When a ratio between the actual fuel injection quantity and the target fuel injection quantity is larger than a specified value and when the ratio between the actual fuel injection timing and the target fuel injection timing is larger than a specified value, it may be determined that the fuel injection malfunction exists.

The present invention can be applied to an intake port injection engine.

The present invention can be applied to a system in which a combustion mode is changed in a lean burn engine of an intake port injection type.

What is claimed is:

1. A monitoring system for an internal combustion engine including a fuel injection control means for outputting a fuel injection signal to an injector based on a target fuel injection quantity and a target fuel injection timing according to a driving condition of the engine, the monitoring system comprising:
    a computation means for computing an actual fuel injection quantity and an actual fuel injection start timing based on the fuel injection signal; and
    a determination means for determining whether a fuel injection malfunction exists by comparing the actual fuel injection quantity and the target fuel injection quantity and comparing the actual fuel injection start timing and the target fuel injection timing; wherein
    the determination means determines that the fuel injection malfunction exists when a difference between the actual fuel injection quantity and the target fuel injection quantity is larger than a first specified value and when a difference between the actual fuel injection start timing and the target fuel injection timing is larger than a second specified value, and
    the determination means determines that no fuel injection malfunction exists when at least one of (i) the difference between the actual fuel injection quantity and the target fuel injection quantity is less than or equal to the first specified value, and (ii) the difference between the actual fuel injection start timing and the target fuel injection timing is less than or equal to the second specified value.

2. A monitoring system according to claim 1, further comprising a monitoring means for monitoring the computation means and the determination means.

3. A monitoring system according to claim 1, further comprising:
    a mode switching means for switching a combustion mode according to the driving condition of the engine;
    a first torque computation means for computing an air-quantity-base actual torque based on an intake air quantity of the engine;
    a second torque computation means for computing a fuel-quantity-base actual torque based on one of a fuel injection quantity and an air-fuel ratio of the engine; and
    a torque malfunction determination means for selecting one of the air-quantity-base actual torque and the fuel-quantity-base actual torque as a malfunction determination actual torque according to the combustion mode, and determining whether a torque malfunction exists by comparing the malfunction determination actual torque with a required torque, wherein
    the torque malfunction determination means defines the air-quantity-base actual torque as the malfunction determination actual torque in any combustion mode when the determination means determines that the fuel injection malfunction exists.

4. A method of monitoring an internal combustion engine including a fuel injection controller for outputting a fuel injection signal to an injector based on a target fuel injection quantity and a target fuel injection timing according to a driving condition of the engine, the method comprising:
    computing an actual fuel injection quantity and an actual fuel injection start timing based on the fuel injection signal;
    determining whether a fuel injection malfunction exists by comparing the actual fuel injection quantity and the target fuel injection quantity and comparing the actual fuel injection start timing and the target fuel injection timing; wherein
    said determining whether a fuel injection malfunction exists includes determining that the fuel injection malfunction exists when a difference between the actual fuel injection quantity and the target fuel injection quantity is larger than a first specified value and when a difference between the actual fuel injection start timing and the target fuel injection timing is larger than a second specified value, and
    said determining whether a fuel injection malfunction exists includes determining that no fuel injection malfunction exists when at least one of (i) the difference between the actual fuel injection quantity and the target fuel injection quantity is less than or equal to the first specified value, and (ii) the difference between the actual fuel injection start timing and the target fuel injection timing is less than or equal to the second specified value.

5. A method according to claim 4, further comprising monitoring said computing and said determining.

6. A method according to claim 4, further comprising:
    switching a combustion mode according to the driving condition of the engine;
    computing an air-quantity-base actual torque based on an intake air quantity of the engine;
    computing a fuel-quantity-base actual torque based on one of a fuel injection quantity and an air-fuel ratio of the engine; and
    selecting one of the air-quantity-base actual torque and the fuel-quantity-base actual torque as a malfunction determination actual torque according to the combustion mode, and determining whether a torque malfunction exists by comparing the malfunction determination actual torque with a required torque, wherein
    the air-quantity-base actual torque is defined as the malfunction determination actual torque in any combustion mode upon a determination that the fuel injection malfunction exists.

* * * * *